United States Patent Office 2,736,641
Patented Feb. 28, 1956

2,736,641
FUEL OIL ADDITIVE

Raymond W. Mattson, Yorba Linda, and Frederick S. Scott, Whittier, Calif., assignors to Union Oil Company of California, Los Angeles, Calif., a corporation of California No Drawing. Application February 1, 1952, Serial No. 269,592

10 Claims. (Cl. 44—71)

This invention relates to fuel oils, and more particularly to means and methods for inhibiting or preventing the separation of sludge from such oils. This objective is achieved herein by the addition to the fuel oils of a small amount of a special class of surface active materials, as will be more particularly described hereinafter.

The term "fuel oil" includes a rather wide variety of petroleum products. Most generally the term is used to designate heavy petroleum distillates or residuals which are used for firing boiler furnaces in power plants, locomotives, steamships, etc., or for other heating purposes. Gas oils, and oils which are essentially crude oils, may also be used for fuel purposes in some cases. The common types of stove oils and furnace oils used for domestic and industrial heating purposes may likewise be included within the designation of fuel oils. These materials are, of course, largely hydrocarbons, but generally contain also fairly high proportions of sulfur compounds and nitrogen compounds, especially in the case of the residual, or undistilled, oils. They may contain, for example, from about 0.2% to 5% sulfur in the form of organic and inorganic compounds, and from about 0.3% to 2.0% nitrogen in the form of organic compounds.

Fuel oils are generally characterized on the basis of viscosity, gravity, and flash-point. Residual fuel oils usually have a flash-point between about 130–250° F., and distillate oils between about 100–200° F. The viscosity of distillate fuels may range between about 30–250 seconds Saybolt Universal at 100° F., and that of residual oils between about 25 to 300 seconds Saybolt furol at 122° F. The A. P. I. gravity of fuel oils generally ranges between about 10 and 38. The residual types of fuel oils may be thermally cracked which lowers their pour-point and viscosity index, and also increases their heating value. Obviously, in order to adjust the characteristics of the oils to meet particular needs, various blends of distilled, residual and cracked stocks may be compounded.

Another important, and in this case, troublesome characteristic of nearly all fuel oils is their tendency to form a sediment or "sludge" during storage or transportation. The deposition of this sludge frequently creates great difficulties in the burning of the oil. The sludge itself is usually largely combustible, but creates mechanical difficulties by plugging or occluding various passageways through which the oil must flow. For example, when the sludge has deposited in a storage tank to the point where it may enter a line to the burner, various parts of the line may become obstructed, as for example, screens, valves, and particularly the burner tip itself. Sludge may also deposit of its own accord within the line, independently of any sedimentation which may have occurred in the tank. Physical changes in the environment of the oil are particularly apt to bring about precipitation of sludge.

The exact physical and chemical causes for sludge precipitation are not known with certainty. Oxidation, or a redistribution of electrostatic charges on colloidal particles may be causative factors. The absorption of water into the oil from atmospheric condensation, normally occurring as a result of the diurnal "breathing" of a storage tank may also enter in as a causative factor.

Descriptively, the sludge itself usually appears as a black, amorphous or livery mass when formed in residual type oils. This mass is essentially a concentrated emulsion of water in oil, and in addition usually contains asphaltenes and foreign matter such as lint, sand, and dust. Some sludges may contain waxes. In the case of cracked oils especially, carbonaceous particles may also be present. The sludge which forms in distilled oils is generally a brown, resinous material containing little or no water.

Since fuel oils generally are relatively cheap materials, it is not economically feasible to provide elaborate purification means for removing the sludge or its precursors from the oil.

It is accordingly an object of this invention to provide economical means for preventing the precipitation of sludge from fuel oils.

A more specific object is to prevent the precipitation of sludge by adding materials to the oil which will cause the sludge particles to either remain in suspension, or inhibit their intital formation in precipitable form.

A still further object is to avoid the preciptaton of mechancally troublesome sludge, and at the same time retain the full calorific value of the combustible materials making up the sludge.

Other objects will be apparent from the detailed description which follows.

In view of the nature of the oil and the sludge, as outlined above, it might appear superficially that any oil-soluble surface active material having detergent or emulsifying properties could be employed to disperse the sludge, or to maintain it in a dispersed state. We have found, however, that this is not true; many known surface-active materials are of no value for the present purpose. For example, soaps, lecithin, sodium dioctylsulfosuccinate and octadecylamine have been found to be relatively ineffective when used singly.

The present invention embraces our discovery of a particular class of surface-active chemical compounds which are highly effective for maintaining the sludge in a fuel oil in a dispersed state, or for otherwise preventing the formation or precipitation of such sludge. These compounds consists of the amides derived by the condensation of an alcohol-amine, preferably a lower alkanolamine, wtih a carboxylic acid derivative, preferably a higher fatty acid derivative, e. g. acyl chlorides and anhydrides. They are broadly characterized as amido alcohols having preferably more than 8 carbon atoms, and more particularly as amido alcohols having the following general formula:

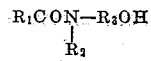

wherein $R_1$ and $R_3$ are hydrocarbon groups and $R_2$ is hydrogen, hydrocarbons, or a hydroxy hydrocarbon group. $R_1$, $R_2$, and $R_3$ may, for example, be represented by alkyl groups, either straight or branched chain, aryl groups, aralkyl, alkenyl, naphthenyl, naphthenylalkyl, or any combination of these categories. In addition, $R_2$ may consist of any of the above hydrocarbon radicals substituted by one or more hydroxyl groups. A class of preferred compounds is represented by the above formula wherein $R_2$ is hydrogen and $R_1$ and $R_3$ are alkyl groups. A still further preference is that $R_3$ should be a lower alkyl group having less than about 5 carbon atoms, and $R_1$ should be a higher alkyl group having between about 10 and 18 carbon atoms. Compounds falling within the above classifications include for example the following:

decanoic acid amide of ethanolamine:

$$CH_3(CH_2)_8CONHC_2H_4OH$$

dodecanoic acid amide of diethanolamine:

$$CH_3(CH_2)_{10}CON(C_2H_4OH)_2$$

benzoic acid amide of N-methyl ethanolamine:

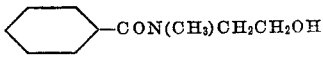

γ phenyl propionic acid amide of 4-butanolamine:

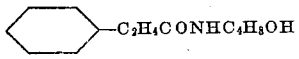

8-cyclohexyl octanoic acid amide of ethanolamine:

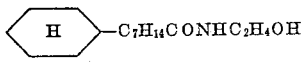

oleic acid amide of γ propanolamine:

$$CH_3(CH_2)_7CH=CH(CH_2)_7CONHC_3H_6OH$$

lauric acid amide of ethanolamine:

$$CH_3(CH_2)_{10}CONHC_2H_4OH$$

Manifestly, many other compounds of a nature chemically similar to the above may be employed. Inasmuch as these materials are generally prepared from mixed industrial by-products, they will often consist of mixtures of analogous or homologous compounds. These amido alcohols are in general well-known in the art, and are prepared by well-known processes. Neither the compounds per se, nor their method of preparation forms a part of this invention. It may be stated in general, however, that they may be prepared by dehydration of the corresponding substituted ammonium salts, or by treating the appropriate acyl chlorides, esters or anhydrides with the desired amino alcohol. For example, the glycerides, or other esters of fatty acids may be condensed with the appropriate alkanolamines such as ethanolamine. This method is set forth in greater detail in the literature, for example, in a publication by D'Alelio and Reid in Jour. Am. Chem. Soc. 59, 111–12 (1939).

The proportion of these additives to be employed will vary widely with the nature of the fuel oil being treated, its sludge forming capacity, and the subsequent treatment to which it is to be subjected. Distillate fuel oils will generally require smaller amounts, while residual oils will require more. Larger quantities will be required to stabilize any fuel oil that is to be stored for long periods of time and/or under severe sludge-forming conditions, as in very wet environments or climatic conditions, or in contact with catalytically acting sludge formers, or electrolytic destabilization factors. It is manifest therefore that the amount of additive required must be determined by experiment for each fuel oil, and to meet the particular conditions under which the oil is to be stored or transported. In general, the operative proportions are found to range between about 0.01% to 2.0% or more by weight. These proportions are found to give an increased sludge dispersion of between 10% and 85% greater than when no additive is employed as indicated by the tests described hereinafter. Although higher concentrations of additive could be used, it will generally be found that such large proportions are unnecessary and uneconomical. For most practical applications, concentrations of 0.025% to 1.0% are adequate.

The method of addition of the additive to the fuel oil may be by simple admixture, with suitable agitation to dissolve or disperse the material. Most of the additives disclosed herein are not appreciably soluble in fuel oils and are hence merely dispersed therein. The compounds containing long chain hydrocarbon components are more soluble than the short chain compounds. If desired, the additive may be first dissolved in a solvent in order to facilitate admixture with the fuel oil. Suitable solvents include, for example, benzol, toluol, acetone, methyl ethyl ketone, alcohols, esters and in some cases aliphatic or naphthenic hydrocarbons. The additive, either alone or in a solvent may, for example, be placed in a storage tank, and the fuel oil admittted thereto in the usual manner, whereby the generated turbulence gives sufficient agitation to form a homogeneous mixture. If desired, the additive may be metered into an oil transfer line through a suitable valve whereby the turbulence of flow provides ample agitation. Obviously, many other modes of addition may be employed, as will be obvious to those skilled in the art.

The additives disclosed herein are found not only to prevent sludge formation, but to redisperse sludge that has previously formed, and to stabilize such dispersions. We have found that these two latter phenomena make possible a ready and practical test for evaluating the stabilizing activity of fuel oil additives. According to this test procedure, a measured quantity of fuel oil is mixed with a certain quantity of fuel oil sludge, and the desired quantity and type of additive is added. This mixture, together with a control blank containing no additive, is agitated for a given time, then centrifuged, and the water content of an aliquot of the supernatant oil is determined and compared with the water content of a similar aliquot of the supernatant layer in the blank, which has been treated in a similar manner throughout. Inasmuch as the sludge contains about 50% of water, the proportion of water found in the supernatant layer is a measure of the amount of sludge remaining dispersed in the oil. The higher the water content of the test sample layer, as compared to that of the blank, the higher is its sludge dispersion. The percent dispersion is calculated as follows:

$$\text{Percent dispersion} = \frac{A-B}{C-B} \times 100$$

where:

$A$ = ml. water after centrifuging in 75 ml. of supernatant oil containing the additive $B$ = ml. water after centrifuging in 75 ml. of supernatant oil containing no additive $C$ = ml. water before centrifuging in 75 ml. of original oil and sludge mixture From the above it will be seen that a percent dispersion above 0 means that the particular additive has at least some value as a stabilizer, and a percent dispersion below 0 means that the additive is a sludge precipitator.

The above general procedure was employed for testing the activity of the additives herein described. Some of the results are as outlined in the following examples, which should be considered as illustrative only, and not limiting:

Example I

In this example an alkyl amido alcohol was employed which consisted predominantly of C–12 alkanoic acid amides of ethanolamine, and was designated commercially as Michelene DS. Each of six 150 gm. samples of a residual type fuel oil derived from California crudes, and having an API gravity of 11.2 and a furol viscosity of 33 seconds at 122° F. was admixed, in 8 oz. bottles, with 30 gms. of a fuel oil sludge having the following approximate makeup:

| | Percent |
|---|---|
| Material insoluble in cleaner's naphtha | 11.7 |
| Material insoluble in chloroform | 8.2 |
| Asphaltenes, by difference | 3.5 |
| Water, by distillation | 52.0–53.0 |
| Ash | 8.5 |

To the naked eye this sludge was a livery black material, and microscopic examination showed it to be a water in oil type of emulsion containing no wax. To each of these mixtures was added in pure form 0.55% by weight of the above identified additive consisting essentially of C-12 alkanoic acid amide of ethanolamine. The six samples, together with appropriate blanks, also in 8 oz. bottles, were rotated in a tumbling device for 45 minutes. Immediately after the tumbling period, a 100 ml. sample from each bottle was poured into a centrifuge tube and centrifuged 10 minutes at 2,000 R. P. M., after which 75 gms. of the supernatant oil was poured off and subjected to analysis for water by distillation. The results were as follows:

| Sample | Water by Dist. in Supernatant Oil, ml. | Increased Dispersion, percent by weight |
| --- | --- | --- |
| 1 | 5.0 | +55 |
| 2 | 5.3 | +73 |
| 3 a | 3.5 | +36 |
| 4 b | 5.7 | +63 |
| 5 a | 2.7 | +19 |
| 6 c | 3.5 | +37 | a 30-minute centrifuging period.
b Stood overnight after centrifuging before determining water.
c Centrifuging replaced by 77-day standing period.

Specific data on the blanks which were run concurrently with the above samples are not given herein, but may be calculated by employing the above formula for per cent dispersion. The data reported above shows that 0.55% by weight of the product Michelene DS may be expected to give approximately 20% to 75% better sludge dispersion in fuel oils as compared to the same fuel oil containing no additive.

*Example II*

Four additional 180 gm. samples of the fuel oil-sludge mixture employed in Example I were admixed with varying proportions of Michelene DS, either alone or in a solvent, and subjected to the same test conditions reported in Example I. Appropriate blanks were also run. The results were as follows:

| Sample | Conc. of Additive, percent by wt. | Solvent Used | Water by Dist. in Supernatant Oil, ml. | Increased Dispersion, percent by wt. |
| --- | --- | --- | --- | --- |
| 7 | 2.75 | None | 6.2 | +86 |
| 8 | 0.055 | MEK c | 4.0 | +10 |
| 9 a | 2.75 | None | 4.1 | +48 |
| 10 b | 0.005 | Benzol | 1.6 | −2 | a 30-minute cenitrifuge period.
b Centrifuging replaced by 77-day standing period.
c Methyl ethyl ketone.

This experiment shows the feasibility of employing solvents for the additive, and shows in addition that amounts of additive as low as 0.055% may be expected to give an appreciable increase in stability.

*Example III*

In order to illustrate the comparative effects obtainable with additives other than the class herein claimed, the following data is cited showing the per cent dispersion obtainable with various representative commercial surface active materials. In all cases 0.55% of additive was employed. The test conditions were the same as those set forth in Examples I and II:

| Additive | Chemical Composition | Water by Dist. in Supernatant Oil | Increased Dispersion, percent by wt. |
| --- | --- | --- | --- |
| Michelene 30 | Amine — fatty acid condensate. | 3.5 | +4 |
| Naphthenic acid amide | | 3.5 | −7 |
| Aerosol OT-N | Sulfosuccinate. | 3.1 | −9 |
| Santomerse DT | N-alkylated alkylene polyamine. | 4.0 | +13 |

This example shows that some surface active materials give a negative percent increased dispersion, indicating that they are actually sludge precipitators. None of the above materials are as effective as the class of amido alcohols set forth herein.

*Example IV*

About 1,900 gallons of a heavy residual fuel oil obtained from mixed California crudes, and having an API gravity of about 15 and a furol viscosity of about 30 seconds at 122° F. is admitted to a 2,000 gallon oil storage tank containing about 13 pounds of a condensation product of stearic acid ester and ethanolamine. This condensation product consists essentially of the stearic acid amide of ethanolamine. Adequate mixing of the additive with the oil is produced by the turbulence generated by the incoming oil. The oil mixture is piped to a horizontal burner used for firing a steam boiler. After several days operation no clogging of fuel lines or burner tip is noted, whereas the same oil normally necessitates daily, or 48 hour cleaning of the burner tip. Essentially no sludge is formed in the bottom of the tank. The foregoing disclosure is not to be considered as limiting since many variations may be made by those skilled in the art without departing from the scope or spirit of the following claims.

We claim:

1. A fuel oil containing a minor proportion, sufficient to inhibit the separation of sludge, of a surface active amido alcohol consisting essentially of a fatty acid amide of a lower alkanolamine, said fatty acid containing from 10 to 18 carbon atoms.

2. A composition as defined in claim 1 wherein said fuel oil contains between about 0.01% and 2.0% by weight of said amido alcohol.

3. A composition as defined in claim 1 wherein said fuel oil is a residual oil which normally tends to precipitate a dark, livery, water-in-oil emulsion type of sludge.

4. A composition as defined in claim 1 wherein said lower alkanolamine is a dialkanolamine.

5. A composition as defined in claim 1 wherein said lower alkanolamine is a monoalkanolamine.

6. A composition as defined in claim 1 wherein said amido alcohol is a lauric acid amide of ethanolamine.

7. A composition as defined in claim 1 wherein said amido alcohol is a stearic acid amide of ethanolamine.

8. A composition as defined in claim 1 wherein said amido alcohol is an oleic acid amide of 3-propanolamine.

9. A composition as defined in claim 1 wherein said amido alcohol is a dodecanoic acid amide of diethanolamine.

10. A composition as defined in claim 1 wherein said amido alcohol is a decanoic acid amide of ethanolamine.

References Cited in the file of this patent

UNITED STATES PATENTS

| | | |
| --- | --- | --- |
| 2,403,067 | Fischer et al. | July 2, 1946 |
| 2,527,987 | Caron et al. | Oct. 31, 1950 |
| 2,550,982 | Eberz | May 1, 1951 |
| 2,553,183 | Caron | May 15, 1951 |
| 2,559,574 | Weissberg | July 3, 1951 |
| 2,579,890 | Wies | Dec. 25, 1951 |
| 2,604,452 | Morway | July 22, 1952 |

OTHER REFERENCES

Surface Active Agents, Schwartz-Perry, pg. 212; 1948, Interscience Pub., 215 4th Ave., New York, N. Y.